July 18, 1944.                C. W. CALDWELL ET AL                2,353,633
                                RECORDING APPARATUS
                  Filed Nov. 30, 1942           3 Sheets-Sheet 1

Fig. 1.

INVENTORS
CHESTER W. CALDWELL,
ARTHUR K. BRANHAM
BY
H. S. Grover.
ATTORNEY

July 18, 1944.  C. W. CALDWELL ET AL  2,353,633
RECORDING APPARATUS
Filed Nov. 30, 1942   3 Sheets-Sheet 2

INVENTORS
CHESTER W. CALDWELL
ARTHUR K. BRANHAM
BY
W. S. Snow
ATTORNEY

July 18, 1944.  C. W. CALDWELL ET AL  2,353,633
RECORDING APPARATUS
Filed Nov. 30, 1942   3 Sheets-Sheet 3

Patented July 18, 1944

2,353,633

UNITED STATES PATENT OFFICE 2,353,633

RECORDING APPARATUS

Chester W. Caldwell, West Lafayette, and Arthur K. Branham, La Fayette, Ind.

Application November 30, 1942, Serial No. 467,420

18 Claims. (Cl. 234—36.5)

This invention relates primarily to recording apparatus of the general type used for measuring speed or velocity, or used for the purpose of recording indications, such as time measurements, by which records of such conditions may be produced.

Broadly speaking, the present invention is directed to a form of apparatus which will be illustrated by reference to speed measurements and which depends for its functioning primarily upon the time measuring instrumentalities comprising essentially units for detecting, timing and recording such phenomena.

Furthermore, the present invention is directed particularly to apparatus of the type designed to measure and record accurately small time intervals or a sequence of such time intervals from which the desired observations may be obtained, and from which it is possible to obtain acceleration patterns of both positive and negative acceleration for measuring speeds, for counting and like, and for all generally related purposes.

For the purpose of explaining this invention in one of its preferred forms and in one of its preferred uses, and merely for the purpose of providing an illustrative adaptation of the device, reference will be made particularly to its use as a traffic speed recorder.

It has been known for some time that speed of vehicles is one of the more important factors causing the ever increasing highway accident record. In the past, various systems have been proposed whereby economical measurements and observation of speeds of moving vehicles, such as automobiles, moving aircraft, shells and the like, have been obtained, and many significant advances in the art have been made from time to time.

The present invention, however, is directed primarily to apparatus which will have as one of its main objectives, that of providing great operability, the use essentially of standard parts in construction, a great ease of operation, a great precision in the measurements obtained, and a permanency of the economically obtained record.

Still further objects of the invention are those of providing an accurate and high speed means of counting and recording graphically, which will measure accurately extremely small time intervals or successive time intervals, and, at the same time, accurately record such intervals, whereby the intervals can be interpreted at speeds or acceleration patterns.

The device disclosed thus becomes particularly useful in the measurement of automotive speeds and accelerations, so as to record corresponding lateral positions of vehicles on highways. It is also particularly useful in the recording of acceleration patterns of falling bodies.

In addition, the herein described arrangement is particularly useful in measuring and determining both horizontal and vertical landing and takeoff positions of aircraft, as well as the speed and acceleration patterns of catapulted aircraft, and, still further, the speed and acceleration of shell projectiles in ballistic recording.

Other objects of the invention are those of providing a speed or velocity measuring and recording unit which will be capable of accurately recording and measuring extremely short time intervals or sequences thereof, and which at the same time is substantially free from complexities which would tend to cause uncertain and inaccurate operation.

Other objects and advantages of the invention will be found from a reading of the following specification and claims considered in connection with the accompanying drawings, wherein.

Each of Figs. 2 and 3 represents modifications of a portion of the circuit of Fig. 1;

Fig. 4 represents, in schematic form, the general arrangement of the various units in an operating state;

The invention herein to be disclosed, being one related to measuring and recording apparatus, is one which depends upon fundamental time measuring units and consists, therefore, of apparatus for detecting, timing and recording the time of occurrence of certain desired phenomena.

In its preferred form, as herein illustrated, the invention comprises essentially a recording clock of extreme accuracy which is started in operation upon the commencement of one phenomenon, and which is retained in operation until certain other phenomena occur, after fixed or variable time periods, serving to disconnect the drive.

In order to record the conditions appearing upon the clock dial, which will indicate the time of commencement and the time of completion of some phenomena, as well as intermediate times under some conditions, a recording film is arranged to receive the light image of the clock dial and to record it, with the clock dial having been illuminated at the desired time periods under the control of a light source which itself is triggered into operation at times concurrent with the control of the driving mechanism for the clock, or which is triggered into operation completely independently of the operation of the clock, where desired.

To provide the recording feature, all of the units comprising the clock, the light source and the recording film are preferably carried within a light-tight compartment, so that, at the flashes of the illuminating means, records of appropriate type may be made.

In its preferred form, the recording mechanism consists essentially of a camera which is mounted so that its optical system forms an integral part of the light-tight compartment, and this instrumentality is usually so set up that the camera is placed in fixed focus position with respect to the clock mechanism. A predetermined aperture is maintained so that for flashes of the illuminating means, records may be made.

Figure 1:
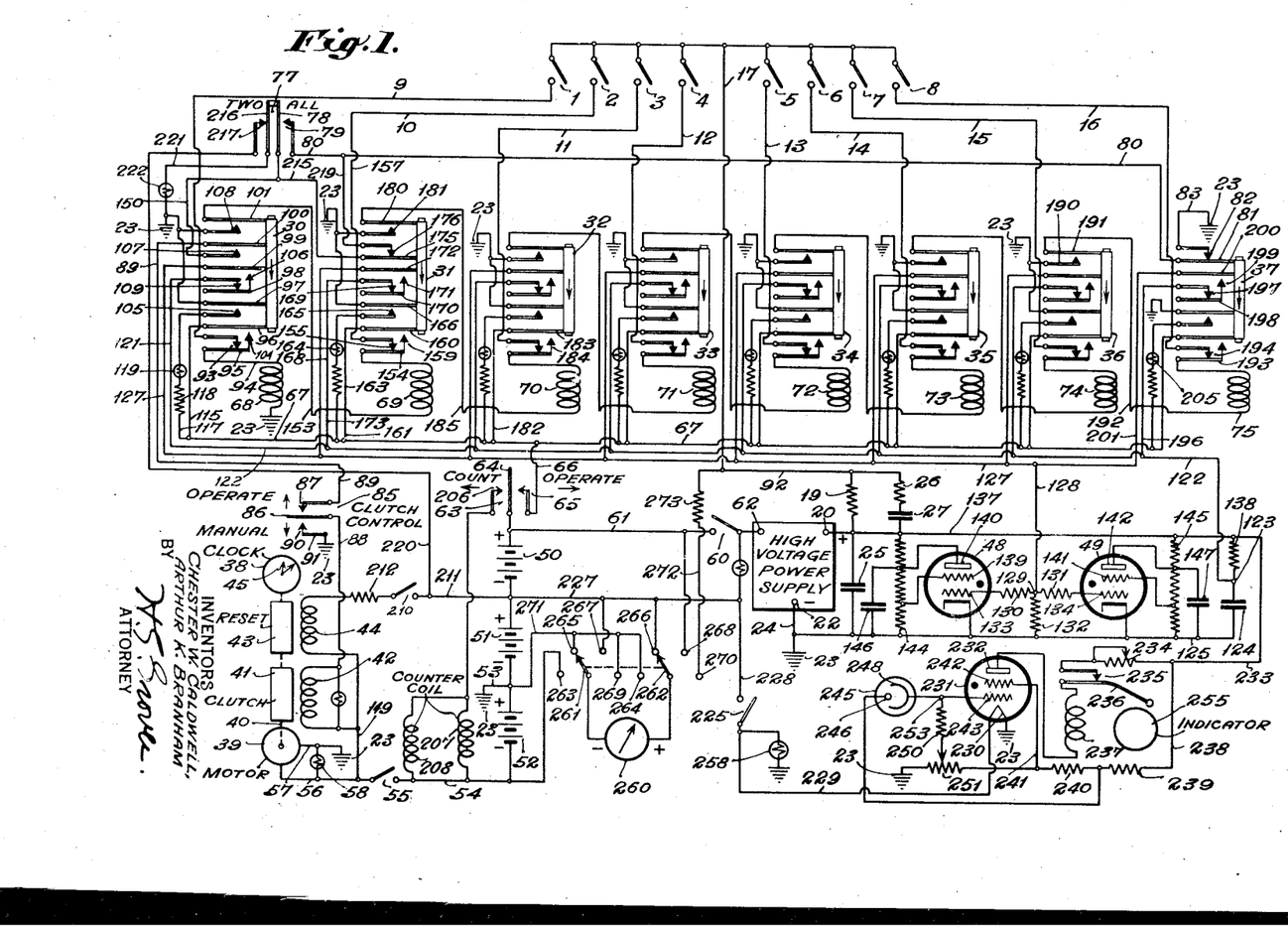
Fig. 1 is a schematic circuit diagram of one circuit operating to control the recording instrumentality.

To control these operations, there is preferably positioned externally of the light-tight housing, a suitable control mechanism, such as that shown for instance as the greater part of the showing of the circuit diagram of Fig. 1, which comprises essentially a plurality of fast-acting relays, a suitable source of power supply control apparatus for the illuminating means, and certain indicating devices to indicate the sequence of operation, as well as to indicate the state of operation.

In its preferred form, as it will herein be explained, the invention will be understood to be operative and used in the process of measuring the speed of automobile vehicles and the like, and, accordingly, when so used, various switching instrumentalities are closed and opened by the passage of the automobile thereover or relative thereto, so that the operation of the complete unit is initiated through the closure of one switching instrumentality due to the action or movement of the vehicle whose speed is to be measured, or the presence of which is to be counted, and the next operation or step in the sequence is likewise dependent upon the motion of the vehicle itself.

If reference is now more particularly made to the apparatus and circuit arrangement shown by Fig. 1, it may be assumed that each of the switch units 1, 2, 3, 4, 5, 6, 7 and 8, which constitute a number of switches illustrated by way of example for the purpose of describing this invention, are positioned across the road or path which is to be traversed by the vehicle in question. Generally speaking, the switches of the type illustrated by Fig. 1 may be of the well known type which are operated by air compression under the actuation of the passage of a vehicle across a rubber tube. The switches are preferably connected by means of a cable or shielded wire to various relay instrumentalities.

The cables 9 through 16 inclusive are connected to the various switch units 1 through 8 respectively, and a common return connection is provided by way of the cable 17 which connects through conductors 18 and 92 and resistor 19 to the positive terminal 20 of a high voltage power supply, conventionally represented at 21, which has its opposite terminal 22 connected to ground 23 by way of a conventional conductor 24, and across whose positive and negative terminals 20 and 22 respectively a relatively large condenser unit 25 is connected in well known manner.

Also connected in parallel with the resistor unit 19 is a second resistor 26 and a series connected condenser 27 which will later be explained.

The various conductors 9 through 16 inclusive connect to contacts of control relays 30 through 37 inclusive, as will herein be explained.

Generally speaking, the arrangement of the connections of all of the relays 32 through 36 is similar to that of the relay 30, except that the contacts of relay 30, for controlling the clutch 41 through the clutch winding 42, are not used, and therefore are not illustrated.

Referring now to the arrangement herein shown, there is provided a clock arrangement 38 which is to be driven from a motor 39 by way of a drive shaft 40 through a clutch element 41 which is magnetically controlled by current flowing through a winding 42, later to be described. A reset mechanism, conventionally shown at 43, for re-setting the clock hands 45, is adapted to be operated by current flowing through a winding 44, also later to be described. This device, when energized, will return the clock hands to an initial position.

The photographing optical system (see particularly Fig. 4) which is to record the image of the clock hands and dial is not shown on Fig. 1 for reasons of simplicity, but the various sources of illumination which, in the form illustrated by Fig. 1, may consist of the gas discharge tubes 48 and 49, are herein shown to be controlled in a manner later to be explained through the action of the relay units. As is well known, a gaseous discharge tube, when caused to operate, will give off adequate light for use in photographic processes as the light source for influencing the sensitive film.

The power supply unit 21 is represented only in schematic form, due to reasons of simplicity, but it is to be understood that this unit preferably consists of a vibrator arrangement of more or less conventional type for the purpose of developing voltages of the order of several hundred volts for operating the various discharge tubes herein to be described. Alternatively, the power supply may be any well known type of rectifier and filter for use with an A. C. supply source. Both such forms of supply are well known and thus need not be explained in further detail.

It is for reasons of portability that the suggested apparatus is used. Where operation is from the usual A. C. power supply line the clock 38 would be driven by a synchronous motor and the power supply would be the conventional rectifier device.

Suitable operating voltages for the various heater units, the drive motor for the clock and the clutch and reset mechanisms, as well as for holding on the relay units in a manner later to be described, are provided by way of a plurality of energy sources conventionally represented as the batteries 50, 51 and 52 which, for purposes of illustration, may each be considered as being of the order of about 6 volts, although it is to be understood that any desired and commonly used form of power supply, other than the illustrated batteries, may be used for the indicated purpose. The various power supply units 50, 51 and 52 hereinafter will be referred to, solely for reasons of simplicity, as batteries, and, accordingly, it will be seen that one terminal of the battery 52 is connected to ground 23 by way of a conductor 53, while the other terminal connects by way of a conductor 54 and the switch 55 and conductor 56 to the motor 39, of which the opposite connection 57 again connects to ground 23.

Connected in shunt with the motor 39 is any desired form of pilot light arrangement, conventionally represented at 58, to indicate whether or not the motor is in an operative state.

In commencing the operation of the system, the switch unit 55 will be assumed to be closed and in an operating state for driving the motor 39. When the complete device herein shown is to be placed in operation, the switch unit 60 is likewise closed to provide the desired closed circuit path for the tubes 48 and 49 through the connection of the batteries 50 and 51 by way of conductor 61 to the terminal 62 of the power supply unit 21 and through the ground connection at 23. The tubes 48 and 49 are preferably cold cathode tubes and thus do not require a heating current source.

Similarly, in order to provide a desired holding current for the relays when once the operation of any relay in the system has been initiated by reason of the closure of any of the switches 1 through 8, the switch 63, marked "Count—Operate" is moved to the right (the "operate" position), so that the switch armature 64 rests against the right side contact 65 and permits energy from the series combination of the batteries 50 and 51 connected to ground at 23 to flow through the conductor 66 and conductor 67 to one of the relay action initiating and holding coils 68, 69, 70—75 of the relays 30 through 37 inclusive, and thereby to hold an initially activated relay in a state of operation, as will herein later be explained. Accordingly, in the commencement of the operation, the switch armature 64 is placed in a position such as to provide the necessary holding current, which switch position is indicated by the legend "Operate" on the drawings.

At the same time, still a further switching unit 77, adjacent to which are the legends "Two" and "All," is preferably moved to the right (the "all" position), so that contact is established between the switch armature 78 and the right side contact point 79 and a conductor 80, which connects to the uppermost armature 81 of the relay 37, and thence to ground 23 through the contactor 82 and conductor 83. The designations or legends "Two" and "All," as applied to the switch 77, are for the purpose of designating whether the first two relays 30 and 31 of the relay system 30 through 37 operate, or whether all of the relays in sequence are capable of operating and in an operative state. Generally speaking, the switch is closed to the right side or "all" position, as indicated, for a commencement of the operation and all of relays 30 to 37 will operate. The system will be so described at first, with later reference being made to the case where the switch armature is in the "two" position and only relays 30 and 31 are effective in the operation.

Next, to start the operation, a further switch unit 85, which is connected in the clutch control circuit of the clutch actuating winding 42, is preferably moved to such a point that the switch armature 86 rests against the upper contact element 87, shown and designated in the "operate" position, in order that current may flow through the conductor 88, the switch armature 86, the contactor 87 and into a further conductor 89. The conductor 88, it will be seen, connects through the clutch actuating winding 42 and the switch 55, as well as the battery 52, to ground at 23. The upper conductor 89 will connect, in a manner later to be described, to one of the relay armatures, for a purpose also later to be described, in that the control provided is that of causing the clutch between the motor 39 and the clock 38 to be engaged to drive the clock.

In its lowermost position, which has been designated by the legend "Manual" on the drawings, a connection is made by way of the switch armature 86, the lower contact 90 and conductor 91 to ground at 23, but this connection is used only where it is desired to start and stop the clock by a manual control which would provide current from the battery 52 flowing through the clutch actuating winding 42 directly to ground.

Generally speaking, in the description of this operation, this form of control will not be referred to in any further detail, and it will be assumed that in the initiation of the operation the switch 85 is moved to the "operate" position. It thus can be seen that to initiate the operation, the switch 55 is closed, the switch 60 is closed, the switch 63 is moved to its right side contact or "operate" position, the switch 77 is likewise moved to the right side contact or "all" position, and lastly, the switch 85 is moved to its uppermost or "operate" position.

Under such circumstances, it can be seen, if the operation is considered to be predicated and initiated upon the closure of one of the switches 1 through 8 inclusive, whenever the switch 1 is closed, for instance, and there will be a current path from ground 23 through the conductor 24, the high voltage power supply unit 21, the terminal 20, condenser 27, the resistor 26, conductor 92, conductor 18, conductor 17, the switch 1, conductor 9 through to the lowermost contact 93 on the relay 30, and thence through the conductor 94 to the relay holding coil 68 to ground at 23.

In this connection it will be seen that the combination of condenser 27 and resistor 26 furnishes most of the initiating pulse of current to actuate the relays from the high voltage source and thus, at the instant of closure of one of the switches 1 through 8, for instance, effectively constitutes a closed circuit through resistor 26 to charge the condenser 27. The resistor 26 functions as a current limiting resistor for the source 21.

It can readily be appreciated that as soon as current flows through the relay holding coil 68, the relay unit itself will be closed and all of the relay armatures 95, 96, 97, 98, 99, 100 and 101 will move downwardly, that is, in the direction toward the relay holding coil, as shown by the arrow, so that these armatures contact the contactors 104, 105, 106, 107 and 108, and simultaneously the connection between the contactor 93 and the armature 95 is broken. Likewise, the connection between the armature 98 and the contactor 109 is broken, although it is to be appreciated that immediately prior to the breaking of the contact between the armature 95 and the contactor 93, and between the armature 98 and the contactor 109, a connection is established between the armature 96 and the contactor 104, and the armature 99 and the contactor 106, respectively. These are thus the type of connections known as the "make before break."

Under these conditions, it at once becomes apparent that the current for holding the relay 30 in an operating state no longer can flow from the supply 21 because, with the operation of the relay, contact between the contactor 93 and the armature 95 is broken, but, immediately prior to this happening, a contact is established between the armature 96 and the contactor 104. This leaves a situation where current can now flow from ground through the relay operating coil 68, the armature 95, which has the contactor 104 formed as a part thereof, the armature 96 and conductor 115, which connects through conductor 67 and conductor 66 to the right side contact 65 of the switch 63 to flow through the switch armature 64 and the batteries 50 and 51 to ground at 23, so that now a closed circuit has been formed to hold the relay 30 in an operated position.

At the same time the circuit to hold the relay 30 closed is established, as is hereinabove explained, there is provided also a parallel circuit through conductor 117 and the voltage dropping resistor 118 and the pilot light 119 to ground 23 by way of the contactor 105 and armature 97, so that an indication is promptly established, externally of the unit, whether or not the relay is actually in operation, as is readily discerned from an observation of the light of the lamp 119 which, like all other pilot light devices, is so supported as to be visible externally of the light-tight unit shown more particularly by Fig. 4.

It was hereinabove explained that the actuation of the relay armatures 98 and 99 provides a form of system which is of the so-called "make before break" contact, so that a connection is established between the contactor 106 and the armature 99 immediately prior to the breaking of the contactor 109 and the armature 98.

It is seen that the contactor 109 connects by way of the conductors 121 and 122 to the terminal point 123, which corresponds to the upper terminal of a capacity element 124 which has its other terminal connected to ground 23 by way of the conductor 125 for a purpose which will later be explained. Likewise, the relay armature 99, which is to make contact with the contactor 106 which, for an instant prior to the breaking of the contact between the contactor 109 and the armature 98, forms a path from the conductor 121 (connected to the upper side of condenser 124) to the armature 99, connects by way of the conductors 127 and 128 to a junction point 129, whereat all of the resistors 130, 131 and 132 are connected. Accordingly, the resistors 130 and 131 respectively connect to the control electrodes 133 and 134 respectively of the gas discharge tubes 48 and 49. At the instant that a connection is established between the armature 99 and the contactor 106 of the relay 30, while the connection between the armature 98 and the contactor 109 is still established, it is apparent that any charge which is placed in condenser 124 (the charging circuit of which will later be explained) may be discharged by reason of the connection through the conductor 128 and the discharge resistor 132. The resistors 130 and 131 are connected to the control electrodes 133 and 134 of the tubes 48 and 49 so that when the condenser discharges across the resistor 132 and a positive potential is applied to the control electrodes 133 and 134 of the gas discharge tubes 48 and 49 respectively, so as to cause these tubes to operate immediately to discharge the stored charge, the resistors 131 and 132 have the effect of limiting the flow of grid current within the tubes. The discharge tubes 48 and 49 thus produce the light to affect the sensitized film in the camera (see Fig. 4). In order that various charges may be accumulated in the condenser 124, it can be seen that this condenser, which has one terminal connected to ground 23 by the conductor 125, may be charged from the terminal 20 of the high voltage supply 21, so that charging takes place through the conductor 137 and the charging resistor 138 so that the condenser is so charged that the charge appearing at the terminal 123 is positive relative to ground.

Operating voltages for gas discharge tubes 48 and 49 are applied by way of the connections of the electrodes 139 and 140 of the tube 48 and the electrodes 141 and 142 of the tube 49 to suitable points on the voltage dividers 144 and 145, as conventionally indicated.

Condensers 146 and 147 are provided which are charged from the high voltage source 21 through the upper portion of the voltage dividers 144 and 145 intermediate the conductor 137 and the connection point to the plate or anode elements 140 and 142 respectively. These condensers are discharged through the tubes 48 and 49 respectively when the tubes draw current, or are ionized.

Accordingly, it can be seen that when the switch 1, for instance, closes, the first charge which has been accumulated by the condenser 124 is discharged, and that the discharge action is interrupted immediately following the making of the contact between the contactor 106 and the armature 99.

The next contact 107 of the relay is established by way of the armature 100, so that under conditions of closure of the relay, a current path will now be established through the clutch actuating winding 42 to actuate the clutch 41 to start the clock, as was hereinabove suggested. The current path for operating the clutch element 41 is now seen to be from ground 23 through the conductor 53, the battery 52, the conductor 54, the switch 55, the conductor 149, the clutch actuating winding 42, the conductor 88, armature 86 of the switch 85 to the contactor 87, and thence through conductor 89 to the armature 100 and to the contactor 107 to the coductor 150, and thence through switch armature 78 and the right side contactor 79 (assuming the switch 77 to be moved to the right to the "all" position), through the conductor 80 and armature 81 of the relay 37 (which relay, at this instance, is not actuated) through the contactor 82 and conductor 83 back to ground at 23.

Thus, at the instant that the condenser 124 is discharged, the clock mechanism is placed in operation, and will continue in operation even though the discharge current no longer flows because of the holding effect established through the holding and actuating coil 68 of the relay, and, accordingly, the clutch 41 is kept in an engaged state.

In connection with the references herein to the condensers 27 and 124, it will be appreciated that the condenser 27 is used in the initiation of the relay action, and then, as soon as the relay is energized, such contacts are closed so as to cause the condenser charge in the condenser 124 to be discharged across the resistor 132 to instantaneously energize the low discharge tubes 48 and 49. This latter connection is made possible by reason of the connection of the conductor 122 from the upper terminal 123 of the condenser 124 to the contactor 109 which makes contact with the armature 98 directly connected to the contactor 106 which contacts with the armature 99 prior to the breaking of the connection between the contactor 109 and the armature 98. This, as herein more particularly explained, permits the condenser discharge to flow via the armature 99 and the conductors 127 and 128 to discharge through the resistor 132.

The remaining contact 108 of the relay 30 connects with the armature 101 when the relay is actuated and thus permits the closure of a preparatory current path for operating the relay 31 by reason of the circuit established from the contactor 108 which connects to ground 23, as indicated, and the conductor 153 to the winding 69 and through the armature 154 and contactor 155 to conductor 157 which connects, as indicated, to the conductor 10 so that when the switch 2 is now closed, a connection will be established also through this switch armature and the conductors 17 and 18 and the resistor 19 to the positive terminal 20 of the high voltage supply 21, and thence to ground 23 to the negative terminal 22 and the conductor 24, all of this occurring of course while the relay 30 is held closed.

Now, let it be assumed that the switch 2, which is assumed to be the next switch in the sequence between 1 and 8, is closed by the instrumentality which closed switch 1, for instance, having moved from the position of switch 1 to the position of switch 2. Then it is obvious that the energy from the supply 21 will flow through the closed switch 2 along the path last referred to, to energize the winding coil 69 to actuate the complete relay 31. Since the connection between the contactor 159 and armature 160 in the actuation of the relay is established before the connection between the contactor 155 and the armature 154 is broken, it immediately becomes apparent that now a holding current for holding the relay 31 in an operative or closed state may flow from the same source 50 and 51 through the conductor 66 to the conductor 161 and the armature 160 to the contactor 159, armature 154, the winding 69, the conductor 153 to the relay armature 101 and its contactor 108, which connects to ground at 23, so that now the relay 31 may be held closed. The closure of this relay 31 also provides a monitoring path by way of the energy supplied from the source 50—51 and the resistance 163, and the pilot light 164 which connects to the contactor 165 which has now made contact with the relay armature 166 which connects to ground 23, and this connection is similar to that described hereinabove for the operation of the pilot light 119.

Still further, since it is desired to have an indication of the position of the clock hands 45 at the instant that the switch 2 is closed, provision is made for discharging the charge accumulated by the condenser 124 in the time interval between the closing of the switch 1 and the closing of the switch 2. Accordingly, by reason of the connection of the condenser 124 through the conductor 122, and now the conductor 168 which connects to the contactor 169 to make contact with the relay armature 170, and thence through the contactor 171 to armature 172 and back through conductor 128 and resistor 132 through the intermediate conductor 173, it can be seen that provision has been made for causing the discharge tubes 48 and 49 to flash at the instant of closure of switch 2. By the establishment of the make before break contact, provided between the contactor 169 and the armature 170, and the contactor 171 and the armature 172, it is evident that the connection from the condenser 124 to the resistor 132 is interrupted immediately upon the breaking of the contact between the contactor 169 and the armature 170, as was the connection interrupted when contact between the armature 98 and the contactor 109 of the relay 30 was broken. Further explanation on this point is deemed to be immaterial.

The armature 175 of the relay 31 connects in its unactuated state with the contactor 176 so that a path of current is provided in parallel with that shown by way of the armature 78 and the contactor 79, which was the current for operating the clock controlled clutch, but since a current path for holding this clutch engaged is provided under conditions when all of the relays are intended to be actuated without regard to that of the armature 175 and the contactor 176, it is apparent that this feature may again be ignored for the time being.

The uppermost armature 180 which is caused to contact with the contactor 181 connected to ground 23 when the relay 31 is operated and held closed by current flowing through the coil 69, establishes a preparatory circuit through the actuating coil 70 of the relay 32, so that when the switch 3 is closed, current will now flow through the actuating winding 70 from the high voltage supply source 21 and the various connections through to conductor 17 to the switch 3 and the conductor 11. Then, when the relay is operated, the holding current will flow from the source 50—51 and the conductor 182 back to ground through the armature 183, the contactor 184, the actuating coil 70, conductor 185, armature 180 and contactor 181 in a manner similar to that explained for holding the relay 31 in an actuated state.

The relays 33 through 36 inclusive function in substantially like manner, and the operation of such relays need not be explained in further detail since it would be mere repetition over what has gone before.

However, it should be borne in mind, as will herein become apparent, that none of the relays 32 through 36 is so arranged as to be capable of starting the clock hands by actuation of the clutch 41 through the coil 42, and likewise, none of these relays has provisions for stopping the clock at predetermined time periods. Under conditions where this form of control became necessary, modifications of the relays could be made to accomplish these purposes as, for instance, by including constants and circuits like those of relays 30, 31 and 37.

It will, however, be seen that relays 31 and 37 are provided with contacts which may be used to stop the clock. For such purpose the relay 31 is usually used for spot speeds, while, to obtain acceleration patterns, the relay 37 would usually be used to control the disconnection of the clock.

It having been explained above how the closure of one relay conditions the next relay for its operation, it will be apparent that after the relay 36 has operated, and the system is used primarily for the purpose of obtaining acceleration patterns, there will be a preparatory circuit established through the relay closure which will be from ground 23 through the uppermost contact point 190 and the uppermost armature 191 through the conductor 192 to the holding coil 75, and thence through the armature 193 to the contact 194, and thence to conductor 16, which will lead to the last switch element 8. When the switch element 8 is closed, the circuit will finally complete itself through the switch and the conductors 17, 18 and 92 through the resistor 19 to the terminals 20 and 22 of the high voltage power supply 21 and to ground 23 through the conductor 24. However, this effect having taken place, it becomes apparent at once that the uppermost relay armature 81, which was above referred to in discussion of the relay 30 and the closure circuit for passing current through the coil 42 to actuate the clutch 41, will be moved from the contact 82 so that the circuit to ground 23 provided by way of the conductor 80 to hold the winding 42 energized, is broken, and immediately the hands 45 of the clock 38 are stopped. However, under such conditions, there nevertheless is a closed circuit path for discharging the stored charge in the condenser 124 in the manner hereinabove explained, since the conductor 122 connecting to the junction point of the condenser 124 and its charging resistance 138 connects to the conductor 196 through the contactor 197 to the relay armature 198, and when the relay has been actuated, this current momentarily flows through the contactor 199 and the armature 200 back through the conductor 201 to the conductor 128 to discharge the condenser 124 across the resistor 132, so that a positive impulse is momentarily applied to the control electrodes 133 and 134 to the tubes 48 and 49. This, as above noted, is due to the make before break arrangement provided between the armatures 198 and 200 and their respective contactors 197 and 199. This contact arrangement is also that provided for the relay action initiating current flow to produce the charge in condenser 27, although the final holding current for any relay flows from the sources 50 and 51 through the various relay holding coils.

It should be appreciated that under such circumstances, the switches 1 through 8 inclusive are closed only momentarily, so that it is possible to pass a relatively large amount of energy into the proper relay actuating coil during the period when the switch is closed.

Although it is desirable to wind the relay coils 68 through 75 inclusive for low voltage operation, and to arrange the contacts as above explained so that the relay will remain energized once it is closed, it is apparent that the holding current can readily flow from the low voltage source, consisting of the indicated batteries 50 and 51, even though the momentary surge of energy which causes the initial actuation of the relay is supplied from the high voltage source, conventionally represented at 21, and usually voltage of the order of 300 volts. In this connection, it should be noted that a resistor 19 functions as a limiting resistor so that excessive currents cannot flow through any relay coil 68 to 75 in case any switch element is held closed more than momentarily.

With the operation above explained, the relay group from the relay 30 through the relay 37 inclusive is seen to operate in sequence, and once a relay is closed or energized, it remains energized through the entire sequence. After the relay 37 has become energized, it remains in an energized state when once actuated, but it serves to open the holding circuit for maintaining the clutch 41 energized to drive the clock hands. However, to count the number of individual energizations of each of the various relays, the switch 63 has been provided, and it will be seen that this switch, in the operation hereinabove explained, has been moved to the right (to its "operate" position) so that the switch armature 64 rested against the contactor 65, and in this way provides the holding current for the various relays from the sources 50 and 51. However, after the relay 37 has been actuated and its operation has been noted by reason of the pilot light 205 having been illuminated in a manner similar to that explained for the pilot lights 119 and 164 of the relays 30 and 31, it is at once apparent that a movement of the switch armature 64 to the left position against the left side contactor 206 will promptly break the current path from the sources 50 and 51 through to any and all of the holding coils 68 through 75 inclusive, so that the relays become de-energized and move upwardly in the direction opposite that shown by the various arrows on the drawings, which arrows are intended to indicate the direction of motion of the relays for operation in an energized state.

At the same time that the holding current to the relay coils is interrupted, the switch armature 64 is moved to the left side contact 206 to the "count" position, and current from the sources 50, 51 and 52 then flows through the coils 207 and 208, which are the coils for operating any well known type of counting devices. Preferably, the coils 207 and 208 are connected in parallel so as to actuate each of two counting devices, of which one is preferably located internally of the light-tight housing so that its indication may be photographed simultaneously with the position of the clock hands, and the other counter is arranged externally of the light-tight housing so that reference data may be recorded in accordance with the principle of the operation.

Whenever the relay 37 has operated in the sequence and caused the current flow through the clutch actuating winding 42 to be interrupted, it is apparent that for the next operation it is desirable to reset the hands 45 of the clock 38 to the initial starting position, and for this purpose a switch element 210 has been provided. Since the switch 55 has remained closed, it is apparent that closure of the switch 210 will permit current to flow from the energy sources 51 and 52 through the conductor 211 and the voltage dropping resistor 212 to the coil 44, and thence through the conductor 149, the closed switch 55 and the conductor 54 back to the voltage source, so that the hands of the clock may immediately be reset to a starting position.

In the operation above explained, it was pointed out that the switch 77 was moved to the right side contact position "all," so that all of the relays 30 through 37 would work in sequence. However, if this switch is moved to the left position for an initial operation, then provision is made so that only the relays 30 and 31 will be operated in the sequence.

As was above explained, the current to operate the clock controlled clutch 41 flows through the coil 42 and thence through the conductor 89 to the armature 106 of the relay 30 which, when closed, makes contact with the conductor 107 which connects via the conductor 150 to the switch armature 78 in order that current may flow through the contactor 79 and the conductor 80 through the upper portion of the relay 37 to ground. There is, however, a current path from the conductor 150 to the conductor 80 through the conductor 215 to the relay armature 175 of relay 31, so that by moving the switch 77 the switch armature 216 rests against the left side contactor 217, the connection between the armature 78 and the contactor 79 will be broken, and the holding current then must flow through the coil 42 into the conductor 80 by way of the connection provided through the conductor 215 and the relay armature 175, the contactor 176 and the conductor 219. But this connection obviously will be interrupted as soon as the relay 31 has been actuated, and thus the holding current for operating the clutch 41 is interrupted promptly with the initiation of operation of the relay 31. Consequently, no new position of the clock hands 45 will occur at any time, no matter how many of the switches 3 through 8, following switch 2, are placed in operation.

In order to indicate whether or not the switch 77 is in the "two" position, or in the "all" position, that is, to the left or the right, a connection has been provided so that energy from the source 51 may flow through the conductor 211, the conductor 220 and the contactor 217 through the armature 216, and the conductor 221 to ground 23 through the pilot light 222, whenever the switch is in the left hand position. This pilot light then will remain permanently lighted, due to the current drawn from the source 51, whenever it is desired that only two of the several relays be effected in the control.

In the operation of the instrumentality hereinabove described, mention was made of the use of the high voltage power supply 21 for the initial actuation of all of the relays 30 through 37. It is apparent that the energy from the high voltage power supply 21 is drawn through the resistor 19 which is assumed to be of relatively high value, and it was explained that in parallel with this resistor was a second resistor 26 and a capacity element 27 serially connected with respect to each other.

It is apparent that when one of the switches 1 through 8 is closed, the capacity 27 acts as a momentary short circuit about the resistor 19 so as to reduce the effective value of the resistor 19 to substantially that of the lower value resistor 26, and, accordingly, it is easily possible to use the high voltage for supplying the initial actuating energy since the high voltage supply is interrupted almost immediately upon the closure of the relay by reason of the interruption of the current path found to exist between the lowermost armature 95 and the lowermost contactor 93 of the relay 30, for instance, and the similar connections for the other relays hereinabove described.

At the same time that the device hereinabove explained is in operation, it has been pointed out that various checking provisions, to determine the state of operation, have been made by way of suitable pilot lights and the like, and to indicate whether or not the tubes 48 and 49, which produce the light for photographing the clock dial and hands, are in operation, provision has been made for connecting an indicating circuit which will respond to the initiation of light in the tubes 48 and 49 and produce therefrom some sort of an audible or visual indication of operation. For this purpose, the switch element 225 may be closed from the position shown, so that energy may be drawn from the source 51 through the conductor 227, the conductor 228, the switch 225 and the conductor 229 to energize the heater element 230 of a gas discharge tube 231. The anode or plate element 232 of the tube 231 is supplied with positive voltage from the source 21 by way of the connection through the conductor 137, the conductor 233 connected thereto, and thence through the variable resistor 234, the contactor 235, armature 236 and the winding 237, later to be explained.

Simultaneously, the screening electrode of the tube is provided with appropriate positive voltage from the same source through the conductor 233 leading into the conductor 238 and the voltage dropping resistors 239 and 240, and thence through the conductor 241 to the screening electrode 242. In this way, it is apparent that the application of a positive actuating potential upon the control electrode 243 of the tube 231 will cause the tube to draw current, and to this end, the photo-electric cell 245 has been provided. The anode 346 of the photo-electric cell is maintained at a positive potential relative to ground from the high voltage source 21 by way of the connections through the conductors 137 and 233, and thence through the voltage dropping resistor 239 and the conductor 247. Likewise, the cathode or light responsive element 248 of the photocell is connected to ground 23 through an appropriate load resistor 250 connecting into the potentiometer 251, so that whenever the photo-electric tube 245 receives light upon its cathode element 248, current will flow through the phototube 245 and carry the potential appearing at the point 253 (which constitutes the junction of the connection of the resistor 250 to each of the photo-electric cathode 248 and the control electrode 243 of the tube 231) to a positive state relative to ground, so that immediately a pulse of current can flow through the tube 231. Whenever current is permitted to flow through the tube 231, it is at once apparent that this current is caused to flow through the coil 237, which may be assumed to be the actuating coil for some suitable source of indicator device such as the bell conventionally shown at 255 which is actuated by a movement of the armature 236. However, as soon as the armature 236 is drawn down to strike the bell 255, it becomes at once apparent that the connection between the armature 236 and the contactor 235 is broken and positive potential is no longer applied to the anode or plate 232 of the tube 231, with the result that the tube immediately returns to its inoperative state, since a gas discharge tube will not function without the application of positive potential, and since the photo-electric cathode 248 of the tube 245 is no longer illuminated because of the fact that the illuminating gas discharge tubes 48 and 49 operate only momentarily.

The result is that the control electrode 243, which connects to ground by way of the resistor 250, now serving as a leak resistor, and the potentiometer 251 maintains a ground potential corresponding to that of the cathode 230 and the indicator 255 will not again be actuated until the next succeeding actuation of the gas discharge tubes 48 and 49, although, due to the interruption of current through the actuating coil 237, the relay armature 236 is returned to its position against the contactor 235 and plate voltage is applied to the tube 231.

Thus, the operator may at once know when a record has been made of the position of the clock hands, merely due to the actuation of the indicator 255 or, where no operator is in attendance, then it is apparent also that the indicator 255 may comprise a counting device, if desired.

Where visible indications are desired of whether or not the switch 225 is operative, a suitable pilot light 258 may be connected, as indicated. Also, for convenience of measurement, a voltmeter 260 may be provided to read immediately the voltage derived from any of the sources 50, 51, 52 and 21, which is done by moving the simultaneously actuated contactors 261 and 262 to any one of the positions shown. In this connection, it may be noted that when the voltmeter or other measuring device) 260 is in positions 269 and 270, it will serve as an indicator for determining the operating conditions of switches 1 through 8, since a momentary deflection of the meter 260 will indicate a closing of any one of the switches.

With the switch arms 261 and 262 resting upon the contactors 263 and 264 being adapted to measure the voltage of the source 52, when resting upon the contactors 265 and 266, measurement of the voltage of the source 51 is made. Similarly, when resting upon the contactors 267 and 268, a measure of the voltage in the source 50 will be made. In the last position, against the contactors 269 and 270, current will flow from ground through the connection 271 and thence to the voltmeter 260 through the switch arm 262 to contact point 270 and conductor 272 and the resistor 273, which has the effect of multiplying the scale of the voltmeter back through the resistor 19 and the high voltage source 21 through the contacts or terminals 20 and 22 and the conductor 24 back to ground at 23. In this way, it is apparent that by moving the uni-controlled switch arms 261 and 262, an immediate and accurate measurement of the voltage of all of the sources may be obtained.

Figures 2, 3, 4:
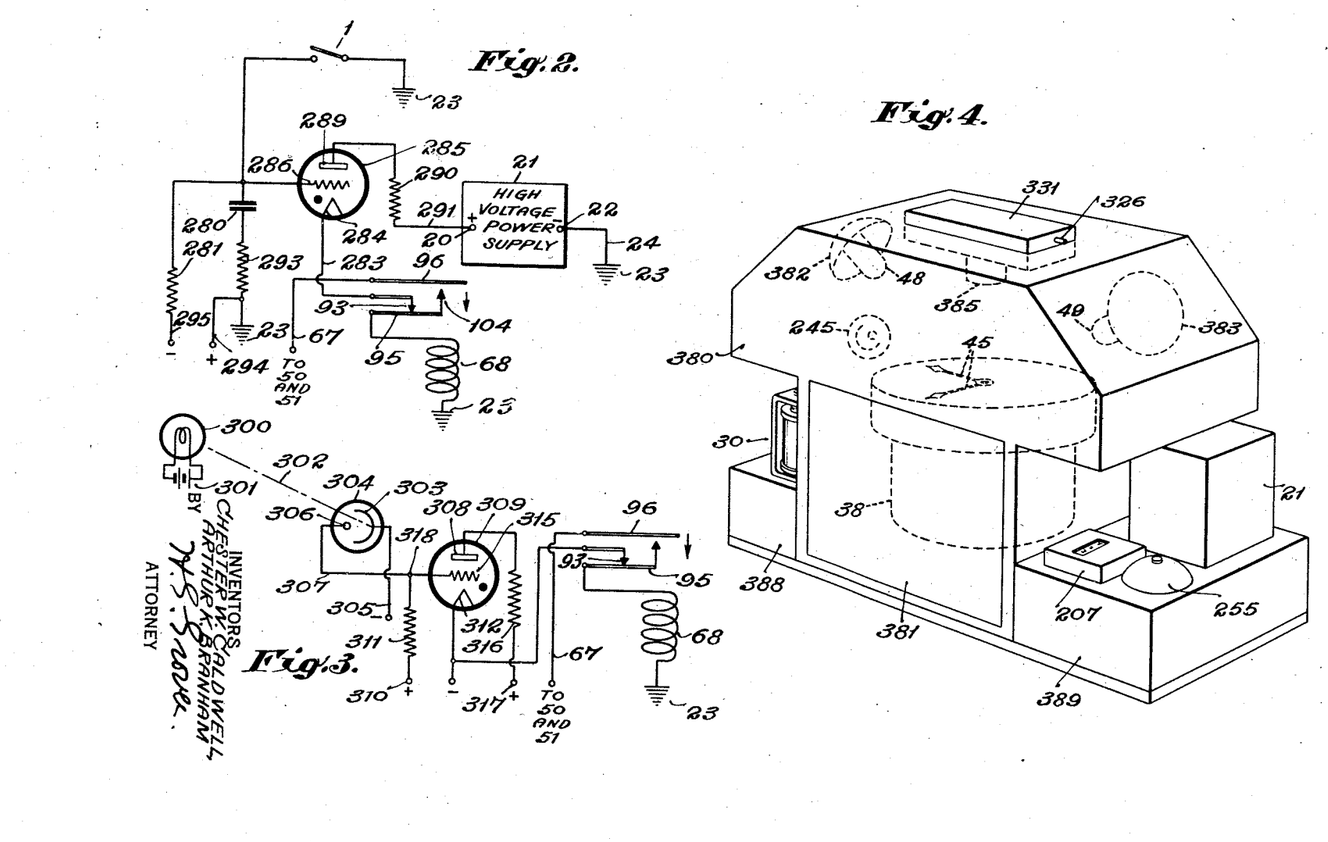

In the modifications disclosed by Figs. 2 and 3, wherein like parts are referred to by like numerals, provision has been made for electronic means to actuate the relay devices 30 through 37. In the modification shown by Fig. 2, the relay device is actuated by providing for an extremely small current to flow through the switch instrumentality 1, for instance, which is shown as connected to ground 23 on one side, and connected on the other side to the junction of the condenser 280 and the resistor element 281.

As was explained in connection with Fig. 1, the relay unit 30 is provided with a holding coil 68 which has one end thereof connected to ground at 23, and the other end of which connects through the armature 95 to the contact point 104 and, prior to actuation, connects to a contactor 93. In the arrangement shown by Fig. 1, this contactor 93 was connected to the conductor 9 and thence to the switch element 1.

In the modification of Fig. 2, where a thermionic device is adapted to control the actuation of the switch element, the contactor 93 connects by way of a conductor 283 to the cathode element 284 of a gas discharge tube 285 whose control electrode 286 connects to the opposite side of the condenser 280 from that to which the switch 1 is connected. The armature 96 of the relay 30 connects by way of the conductor 67 to the voltage sources 50 and 51 which, after the closure of the armature 96 on the contact 104 and the interruption of the current path between the armature 95 and the contactor 93, will serve to hold the relay 30 energized, notwithstanding the fact that an interruption of the current path through the tube 285 will take place.

In order to provide suitable anode voltage for the anode or plate element 289 of the tube 285, a connection is made by way of the resistor 290 and the conductor 291 to the upper or positive terminal 20 of the high voltage source 21, which again connects to ground at 23 by way of the conductor 24.

Appropriate bias for the control electrode of the tube 285 is provided by way of the resistor 293 having its lower end connected by way of conductor 294 to a source of "C" bias potential (not shown), and likewise, the connection from the resistor 281 connects to the negative terminal of the "C" bias source (not shown) by way of the conductor 295. Thus, when the switch 1 is closed momentarily, the condenser 280 is discharged and current is caused to flow through the gas discharge tube 285 to initiate an initial closing or operation of the relay 30, after which the holding current is maintained in the manner explained in connection with Fig. 1.

In the modification of Fig. 3, provision has been made for utilizing the interruption of a light beam upon a photo-electric tube to initiate the operation of a cold cathode type gaseous discharge tube which will, in turn, provide the initial current flowing through the actuating and holding coil of the relay device.

In the arrangement shown by Fig. 3, a light source, conventionally represented at 300, is adapted to be illuminated from any source of voltage, such as that conventionally represented at 301. The light initiated from the lamp 300 is then adapted to be directed along the path 302 to direct itself upon the photo-electric cathode 303 of a photo-electric tube 304. The cathode 303 of this tube 304 normally connects to a suitable negative source via the conductor 305, and the anode element 306 connects by way of a conductor 307 to the control electrode 308 of the gaseous discharge tube 309. Suitable positive voltage for the anode 306 of the photo-tube 304 is supplied by way of the connection of the positive terminal of a source of voltage (not shown) at the terminal 310 and supplying that energy to the phototube through the load resistor 311. The cathode 312 of the tube 309 connects via conductor 313 to the source of negative potential, and via the conductor 314 connects to the contactor 93 of the relay device 30. The anode 315 of the gaseous discharge tube 309 connects by way of the usual load resistor 316 and the terminal point 317 of a source of voltage (not shown), which shall be herein assumed to correspond to the terminal 20 of the high voltage power supply 21 whose negative terminal 22 connects to ground at 23 through a conductor 24, and consequently, the circuit through the tube 309 is completed through the high voltage source and through the relay actuating coil 68 which has one terminal connected to ground 23 in a manner later to be explained.

In the operation of the system, with light normally falling upon the photo-electric cathode 303, it is apparent that photo-electrons will be continually released from the photo-electric cathode to arrive at the anode 306 so that the potential at the point 318, constituting the junction of the connection of the anode 306 and the control electrode 308, to the load resistor 311 shall be negative, so that the tube 309 shall be blocked. This is by reason of the fact that a substantial photo-electric current is drawn by the tube 304.

If, now, however, a vehicle or some other instrumentality passes in the path between the light source 300 and the phototube 304 to interrupt the light beam indicated at 302, it is apparent that the photo-electric current drawn by the tube 304 will decrease, with the result that the potential at the point 318 will rise substantially, or, in other words, become more positive relative to ground, so that the potential of the control electrode 308 of the tube 309 will also rise from a negative state which was adequate to block the tube to a point where the tube 309 draws current, and the current for the tube shall flow through the actuating coil 68 of the relay 30 and the source of positive high voltage for the tube 309.

Under such circumstances, it is apparent that as soon as the current flow through the relay winding 68 is initiated, the relay armatures 95 and 96 shall be moved downwardly in the direction of the arrow, so that contact is established between the contactor 104 of the armature 95 and the armature 96, but contact between the armature 95 and the contactor 93 is interrupted. This then breaks the circuit connection of the positive voltage supply for the tube 309 and carries the tube to a temporarily inoperative state until it shall be again placed in operation by a subsequent interruption of the light beam along the path 302 to the photo-electric tube 304. At the same time, the holding current path for holding the relay 30 in an actuating state is established by way of the connection of the contact 104 and the armature 96 through the conductor 67 connecting to the sources 50 and 51 (said sources not being shown in Fig. 3 for convenience).

It thus becomes apparent that provision may be made for operating the system in a purely electronic manner, as well as by manually or physically controlled switches, in that the electronic manner is controlled solely by the interruption of the light beam.

In a further modification of the arrangement, not herein illustrated, it is apparent that provision for operating a system in two directions, that is, in the direction such that the switch 8 is first closed and the switch 1 is last closed in the sequence, may be made merely by reversing the connection of the various switches so that switch 8 and conductor 16 thereto are made to connect to the contactor 93, rather than switch 1, and that switch 1 and its connection by way of conductor 9 is caused to connect to the contactor 194 of the relay 37, for instance, and that other connections are accordingly reversed in such a manner that the switches 8 through 1 inclusive shall be caused to control the relays 30 through 37 inclusive.

Other modifications of the arrangement of course are obvious and follow from what is herein disclosed.

The complete set-up of the system is better understood by reference to Fig. 4, which shows, in schematic form, the complete assembly unit.

Referring now to the showing of Fig. 4, a representation of a purely schematic form of the complete assembly has been indicated. In this arrangement, it will be seen that the clock 38 is housed within a housing member 380 and is preferably so positioned that access may be had to the interior of the housing by virtue of the slidable member 381. The housing portion 380 is light-tight, so that the camera 331, which is positioned in the upper portion thereof so that the lens element 385 faces the clock dial 45, will be exposed to light only at times when the glow tubes 48 and 49 are caused to flash by reason of the discharge of the condenser 124, as was explained in connection with Fig. 1. New film sections of the film strip (not shown) contained within the housing may be brought before the camera lens 385 by manually depressing the push button or lever 326 or by providing the automatic operating conditions to be later described in reference to Figs. 5 and 6.

In order to direct the light emanating from the glow lamps 48 and 49 upon the clock dial and hands 45, as well as upon the phototube 245, suitable light reflectors 382 and 383 are preferably positioned in co-operative relationship with the glow tubes. Thus, at times when the glow tubes are flashed, the clock dial is illuminated and the image of the clock hands is focused by the camera lens, conventionally represented at 305, upon the film (not shown) carried within the camera proper 331 to produce the desired record.

In this connection, it might be pointed out that for many uses the clock hands are so arranged that the long hand will mark periods of the order of one hundredths of a second per division of the clock, while the short hand will indicate periods varying between one second and twenty-five seconds for each division of the clock. However, these indications are purely arbitrary and are merely given for illustrative purposes. In any event, the important consideration in connection with the time unit is obtaining an accurate measurement of elapsed time between any two events, such, for example, as the closing of switches 1 and 2 or the time between any sequence of events, such as would happen with the closing of any of the series of switch elements 1 through 8 inclusive.

All of the apparatus shown by Figs. 1, 2, 3 and 5 is not shown (for reasons of simplicity) in the schematic assembly of Fig. 4, although it is to be understood that adjacent the housing 380 the various relay elements 30 through 37 may be positioned, and in the compartment 388 beneath the relays provision may be made for including various other instrumentalities, such as the batteries or other energy sources 50, 51 and 52 and the control elements for the clock.

The high voltage supply unit 21 has been conventionally represented at the right edge of the housing, as has the exterior counter 207 and the bell or indicating device 255. Preferably, within the housing portion 389, other circuit instrumentalities are included, such as the tube 231 actuated by the light reaching the photo-electric tube 245 which, in turn, actuates the indicator device 255. The phototube 245 has been conventionally represented also as being within the upper portion of the housing 380, so that it receives the light from the glow tubes 48 and 49 each time these tubes are flashed.

The other instrumentalities which go to make up the complete assembly are not indicated by Fig. 4 for reasons of simplicity, but it is to be understood that the various indicator lamps, switch elements and the like are made visible and accessible from the exterior of the housing element.

Figure 5:
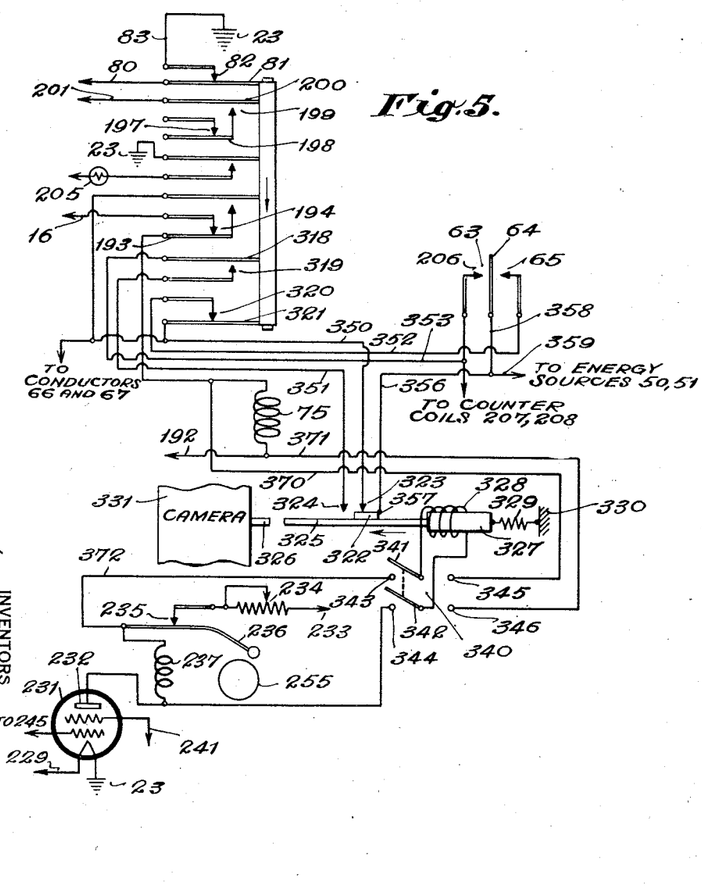
Fig. 5 is a circuit diagram schematically representing a modification and attachment for use in connection with the circuit of Fig. 1 particularly, whereby recordings may automatically be obtained on a new film frame subsequent to each individual recording.

In the arrangement of Fig. 5, a modification of the system hereinabove described has been shown whereby provision is made for making the operation substantially and completely automatic. To this end, a conventional motion picture camera, such, for example as an 8 mm. or a 16 mm. or any other type, is adapted to be used in combination with the arrangement more particularly shown by Fig. 4. By virtue of the circuit connection represented by Fig. 5, the camera is caused to be operated by the closure of any of the switches 1 through 8 to provide a single frame exposure for each switch operation, or alternatively, to provide a single frame exposure for the operation of the complete switch instrumentality whereby the film frame to be exposed to the light of the glow tubes 48 and 49 will be changed after the last switch (switch 8) in the sequence has operated.

It is customary, in the usual camera arrangements, to provide a push button, lever or attachment to advance the film from frame to frame in order to make each new film frame exposure. With the arrangement shown by Fig. 5 combined with the systems of Figs. 1 to 3, operation of the relays 30 through 37 will cause a new frame of the film automatically to position itself in the camera for the purpose of recording the clock indications after each relay in the sequence has been operated. Also, the arrangement of Fig. 5 serves to perform the function of releasing all of the relays 30 through 37 inclusive and to actuate the counter mechanisms 207 and 208 after the relays have been released. To this end, the relay 37 (shown more particularly in Fig. 1, and which relay will be assumed to correspond to the last relay of the sequence) is provided with two additional contactors 319 and 320, and two additional armatures 318 and 321. In operation, the contactor 320 is assumed to contact the armature 321 during an inoperative state of the relay 37, but the contact so made is to be broken upon operation of the relay and a movement thereof in the direction of the arrow which will establish the initial contact between the armature 318 and the contactor 319.

The remaining contactors and armatures shown in connection with the relay 37 in Fig. 5 are as shown by Fig. 1, and like reference numerals have been applied to like elements of Figs. 1 and 5, so that further discussion of the elements shown by Fig. 1 is here unnecessary. It was pointed out, however, in connection with the description of Fig. 1, that when the relay 37 is actuated initially, current from the high voltage source 21 can flow through the path including conductor 192 of the actuating winding 75, the armature 193 and contactor 194 through the conductor 16 to the related switch element 8, and thence through the path hereinabove described. As soon as the current path is initially established through the closure of switch 8 so as to initiate the action of the relay, this circuit is broken, but a holding current path is maintained through the armature 193 to conductors 66 and 67 leading to the energy sources 50 and 51 to maintain the relay in an energized or operated state.

In connection with the arrangement herein shown, the armature 321 is connected to the lead to conductors indicated at 66 and 67 (and thus to energy sources 50 and 51), and likewise a connection is made by way of the conductor 350 to a contactor 323 adapted to form contact with a conducting block 322 on a plunger element 325. The plunger element 325 is preferably formed as an extension of the solenoid element 327 of a relay whose actuating winding is indicated schematically at 328. Energization of the winding 328 will be assumed to move the relay solenoid element 327 to the left, in the direction shown by the arrow, against the tension of a spring 329 (or equivalent device) which is attached both to a fixed support 330 and to the solenoid member 327.

Figure 6:
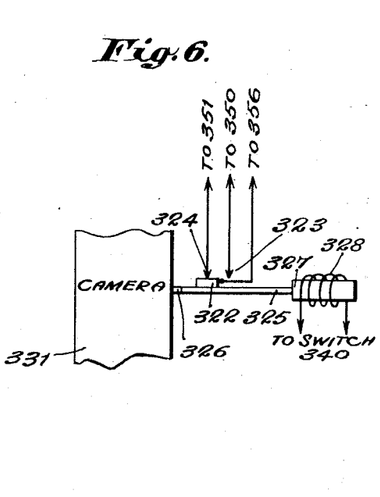
Fig. 6 shows a portion of Fig. 5 when the plunger or film actuator is in an extreme position.

The contactor point 319 is connected by way of a contactor 351 to another contact point 324 which, under predetermined conditions of operation and at times when the solenoid element 327 has been moved to its left, will form contact with the conducting block 322 while at such times the contactor 323 will be moved away from the conducting block 322 so as to break the contact there established (see Fig. 6). Likewise, a connection is established between the contactor 320 and the contactor 65 of the operating switch 63, which connection is made through conductor 352 so that if the armature 64 of the switch 63 rests over against the contactor 65, it can be seen that a connection of the energy sources 50 and 51 (see Fig. 1) connected to the conductor 359 is made to the contactor 320 through the switch 63 and the conductor 352. In this way, energy is supplied to the conductors 66 and 67. To the other side of the switch 63 which, in Fig. 1, was designated as the "Count" position, a connection is made to the contactor 206 by way of the contactor 353 which connects to the armature 318, so that upon energization of the coil 75 and the motion of the relay 37 in the direction of the arrow a connection is made between the armature 318 and the contactor 319, which latter element, it was above stated, connected to the contactor 324.

In order to actuate the solenoid winding 328, a switch element 340 having the switch arms 341 and 342 has been provided. These switch arms are connected to either end of the solenoid winding 328 and, when closed to the left, are shown to contact two terminal points 343 and 344, while, in the right hand position, contact two other terminal points 345 and 346. The latter terminals connect by way of conductors 370 and 371 respectively to the outer terminals of the actuating coils 75 for the relay 37. In order to supply operating voltage to the actuating coil 75, connection is made to the conductor 192 and thence to the armature and contactor 191 and 190 respectively of the relay 36 (see Fig. 1). By virtue of the parallel connection of winding 75 and coil 328 provided with the switch 340 in its right hand position, solenoid winding 328 will be energized whenever coil 75 is energized.

When the switch 340 is in the opposite position (which will be the position here first considered in detail), so that the switch arms 341 and 342 rest respectively upon the terminal points 343 and 344, it will be seen that the solenoid winding 328 is placed in parallel with the coil 237 by way of the connection made through conductors 372 and 373 to the outer terminals of the winding 237. Accordingly, it is apparent that whenever the tube 231 is operated and the switch 340 is closed in its left hand position, current flowing through the tube 231 will flow through both the windings 237 and 328 which are parallelly connected so that both windings are energized.

As above noted, if the switch 340 is in the right hand position against the contactors 345 and 346, current flows through the winding 328 whenever it flows through the coil or actuating winding 75 of the relay 37. Accordingly, due to the energization of the solenoid winding 328, as above indicated, from either current path, the plunger 325 will be assumed to move to the left. Motion of the slider or plunger 325 in the direction of the arrow will provide for it striking against the push button 326 provided on the camera conventionally represented at 331, so as to trigger the camera and cause a new film section to move before the objective lens.

Fig. 6 is a schematic representation of a portion of Fig. 5 with the solenoid winding 328 assumed to be energized and the slider or plunger 325 moved to its maximum position to the left to depress the push button 326. Under these circumstances, it can be seen that the conducting strip 322 which, in the position shown by Fig. 5, had formed a closed circuit between the connection of the conductor 350 to conductors 66 and 67 and the conductor 356 which connects to conductor 359 and, in turn, to the energy sources 50 and 51 (see Fig. 1), now changes its position, due to the solenoid or relay winding 328 having been energized and the plunger 325 is moved to its maximum position to the left, as shown by Fig. 6. Under these conditions, the contactor 323, assumed to remain stationary relative to the conducting strip 322, is now in such a position relative to the conducting block 322 that it no longer contacts the block, but, in its place, contact is now made between the block 322 and the contactor 324. Under these circumstances, with the relay 37 energized, a closed circuit exists between the connection of the conductor 353 to the contactor 206, and thence through the armature 318, the contactor 319, the conductor 351, contactor 324, conducting block 322, connecting point 357, conductors 356 and 359 to energy sources 50 and 51 (shown specifically by Fig. 1) so that the counter coils 207 and 208, which connect to the contactor 206 (see Fig. 1) will be energized. At the same time, the connection which effectively was made between the armature 64 and the contactor 65 is broken through the breaking of contact between the conducting strip 322 and the contactor 323, so that the relays are de-energized and the same effect in the operation is obtained as would be had by disconnecting the circuit of switch 63 between the arms 64 and the contactor 65, and the current which held the relays 68 through 75 in an energized state is interrupted.

Under such conditions of operation, it can be seen that the contactor 323 must remain away from the block 322 a sufficient time to enable each relay to be restored to its deenergized position, and also contactor 324 must remain in contact with the block a sufficient time in order that the counters may operate.

In the operation hereinabove described, there can be time periods when the motion of the plunger and the contactor block 322 relative to contactors 323 and 324 shorts the contactor 323 to the contactor 324, but this is wholly immaterial to the operation.

In providing the operation with the switch 340 in the left hand position, so that the switch arms 341 and 342 contact the terminal points 343 and 344, it is important that the contact between the contactor 235 and the armature 236 be of sufficient time duration to permit proper operation of the solenoid relay whose coil 328 receives its energy from the same source as the coil 237 and is triggered similarly by the actuation of the photo-tube 245 operating through the gas discharge tube 231 at time periods when the tubes 48 and 49 are flashed, all as above explained.

In case it is desired to provide automatic operation of the unit when using a motion picture camera with single frame exposure trip buttton or lever which will so operate as to photograph a multiplicity of images of the clock hands superimposed upon one another, that is, to record the position of the clock hands at the instant each of the switches 1 through 8 inclusive is closed, the operation of the solenoid relay 328 must be such that it will operate just once in the making of a complete record, which time period must be immediately after the relay 37 has been operated.

To perform this type of operation, the switch, instead of being in the left hand position as hereinabove assumed as for the operation first described, will now be moved to the right hand position so that the switch arms 341 and 342 close contact against the contactors 345 and 346 so that the solenoid coil 328 is now placed in parallel with the relay coil 75. The solenoid coil 328, it will be appreciated, is a much slower acting relay than any of the relays 30 through 37 and, accordingly, the relay 37, in its operation, will have ample time to complete its function before the solenoid relay has the opportunity of de-energizing it by breaking the circuit between the conducting block 322 and the contactor 323. Thus, it is apparent that with the switch 340 in its left hand position, as indicated, a single exposure per frame of film per operation of any of the switch instrumentalities 1 through 8 is changed to a multiple exposure of film of the conditions obtaining during any instant during the operation of all of the switches 1 through 8, with the result that a substantial saving of films is obtained.

Various other modifications, of course, come fully within the spirit and scope of what has herein been disclosed, and we believe ourselves to be entitled to make and use all such modifications which fall fairly within the spirit and scope of what is hereinafter claimed as our invention.

Having now described our invention, what we claim as new and desire to have protected by Letters Patent is:

1. A recording device comprising a recording element, a time indicating device, a plurality of switching units each adapted to close momentarily in sequence to indicate an event to be recorded, a series of electrical relay elements individually responsive to each switching operation, means controlled by the operation of the first of the relays to initiate operation of the time indicating device, means controlled by each relay when operated to produce a response of the recording element to represent and record the instantaneous indications of the said time indicating device at the time of each relay operation.

2. An indicator system comprising a recording element, a time indicating device, a plurality of switching elements each adapted to close in sequence to measure the occurrence of an event to be recorded, an electrical relay element connected with each switch element and responsive to each switching operation, means controlled by the operation of the first of the relays to initiate operation of the time indicating device, means controlled by each relay, when operated, to produce a response of the recording element to represent and record the instantaneous indications of the said time indicating device.

3. A measuring system comprising a time indicating device, a light responsive recording element for recording predetermined instantaneous states of the time indicating device, a plurality of switching devices each adapted to close in sequence in accordance with the occurrence of a phenomenon to be indicated, a series of relay elements individually responsive to each switching operation, light producing means controlled by each relay, when operated, to illuminate the time indicating device and thereby to initiate a response of the recording element to represent and record the instantaneous indications thereof.

4. A recording device comprising a time measuring element, a plurality of relay elements individually operatively associated with the time measuring element, means controlled by the first of the plurality of relay elements for initiating an operation of the time measuring element, means controlled by the last of the plurality of relay elements for interrupting the operation of the time measuring element, a charge storing element, and means for continually supplying charging energy to said charge storing element, a light producing means for discharging the charge storing element while simultaneously illuminating the time measuring element, means operated under the control of each relay to produce a substantially instantaneous light flash from the light producing means at the time of each relay operation, a switching instrumentality connected with each of the relay elements to initiate operation thereof in sequence, and a recording device responsive to the light produced by the light producing means for recording the instantaneous indications of the time measuring device.

5. A recording device comprising a time measuring element, a plurality of relay elements individually operatively associated with the time measuring element, means controlled by the first of the plurality of relay elements for initiating an operation of the time measuring element, means controlled by the last of the plurality of relay elements for interrupting the operation of the time measuring element, a charge storing element, and means for continually supplying charging energy to said energy storing element, glow discharge means for discharging the stored charge upon operation of each of the relay elements thereby to produce from the glow discharge means a substantially instantaneous light flash to illuminate the time measuring element, a switching instrumentality connected with each of the relay elements to initiate operation thereof in sequence, and a recording device responsive to the light produced by the glow discharge devices for recording the instantaneous indications of the time measuring device.

6. A time measuring device comprising a clock element, a plurality of relay elements individually operatively associated with the said clock, means controlled by the first of the plurality of relay elements for starting the clock in operation, means controlled by the last of the plurality of relay elements for interrupting the clock operation, a charge storing element, and means for continually supplying charging energy to said element, glow discharge means for discharging the stored charge upon operation of each of the relay elements thereby to produce from the glow discharge means a substantially instantaneous light flash to illuminate the clock, a switching instrumentality connected with each of the relay elements to initiate operation thereof in sequence, and a recording device responsive to the light produced by the glow discharge devices for recording the instantaneous time indications from the clock.

7. A recording device comprising a time measuring instrumentality, a motor to drive the time measuring instrumentality at a substantially constant rate, a plurality of relay elements, a clutch means operated by the first of the plurality of relays at the time of energization thereof for initiating a driving action between the motor and the time measuring element, and a connection from the last relay of the plurality for de-energizing the clutch means to interrupt the drive of the time measuring instrumentality by the said motor, an independent switching device connected with each relay element of the plurality to initiate, when operated, a closure of the associated relay, means to maintain each relay of the plurality in an operated state subsequent to initial operation for a time period continuing until the operation of the last relay of the plurality, a light responsive recording device for recording the instantaneous indications of the time measuring device at the time of each relay operation, an electrical storage element, means to supply charging energy to said storage element continuously, glow discharge means for discharging the stored charge and producing a light flash to illuminate the time measuring device at each flash so that the recordings are produced, and means provided by each relay of the plurality for initiating a discharge of the stored energy at the instant of relay operation.

8. A recording device comprising a clock for indicating and measuring elapsed time, a motor to drive the said clock at a substantially constant rate, a plurality of relay elements, a clutch means operated by the first of the plurality of relays for initiating a driving action between the motor and the clock, a connection from the last relay of the plurality for de-energizing the clutch means to interrupt the clock drive by the said motor, a switching device connected with each relay element of the plurality to maintain the associated relay in an operated state subsequent to initial operation for a time period continuing until the operation of the last relay of the plurality, a light responsive recording device for recording the instantaneous clock indications at the time of each relay operation, an electrical storage element, means to supply charging energy to said storage element continuously, glow discharge means for discharging the stored charge and producing a light flash to illuminate the time measuring device at each flash so that the recordings are produced, and means provided by each relay of the plurality for initiating a discharge of the stored energy through the glow discharge devices at the instant of relay operation.

9. A recording device comprising a time measuring element, a motor to drive the time measuring element at a substantially constant rate, a plurality of relay elements, means to energize the relays of the plurality sequentially, a clutch means operated by the first of the plurality of relays for initiating a driving action between the motor and the time measuring element, a connection from the last relay of the plurality for de-energizing the clutch means to interrupt the drive of the time measuring element by the said motor, means to maintain each relay of the plurality energized subsequent to initial operation for a time period continuing until the operation of the last relay of the plurality, a light responsive recording device for recording the instantaneous indications of the time measuring element at the time of each relay operation, glow discharge means for producing light energy to illuminate the time measuring element to influence the light responsive recording device so that the recordings of the time measuring element are produced, and means provided by each relay of the plurality for rendering the glow discharge means operative to produce light and then, substantially instantaneously, inoperative until the period of operation of the next relay of the plurality.

10. A recording device comprising a time measuring instrumentality, a plurality of relay elements in excess of two, an independent relay operation initiating switch connected to each relay of the plurality to initiate, upon operation, energization of the relay, means operating normally to maintain each relay in an energized state subsequent to initial energization thereof, means controlled by the first relay of the plurality for initiating operation of the time measuring instrumentality, means controlled by the last relay of the plurality for interrupting the operation of the time measuring instrumentality, means responsive to energization of each relay in sequence of the plurality for conditioning the next relay in the sequence for operation, a recording element for indicating the instantaneous condition of the time measuring device, and means operating upon the closure of each relay of the plurality for initiating an operation of the recording device.

11. A recording device comprising a time measuring instrumentality, a plurality of relay elements in excess of two, an independent relay operation initiating switch connected to each relay of the plurality to initiate, upon operation, energization of the relay, means operative normally to maintain each relay in an energized state subsequent to initial energization thereof, means controlled by the first relay of the plurality for initiating operation of the time measuring instrumentality, means controlled by the last relay of the plurality for interrupting the operation of the time measuring instrumentality, means responsive to energization of each relay in sequence of the plurality for conditioning the next relay in the sequence for operation, a recording element for indicating the instantaneous condition of the time measuring device, means operating upon the closure of each relay of the plurality for initiating an operation of the recording device, means responsive to the recording operation initiating means for producing auxiliary audible indications of the instants of recording, and counter means for indicating, upon de-energization of the time indicating device, the number of recordings included.

12. A recording device comprising a time measuring instrumentality, a plurality of relay elements in excess of two, an independent relay operation initiating switch connected to each relay of the plurality to initiate, upon operation, energization of the relay, means operative normally to maintain each relay in an energized state subsequent to initial energization thereof, means controlled by the first relay of the plurality for initiating operation of the time measuring instrumentality, means controlled by the last relay of the plurality for interrupting the operation of the time measuring instrumentality, means responsive to energization of each relay in sequence of the plurality for conditioning the next relay in the sequence for operation, a recording element for indicating the instantaneous condition of the time measuring device, and means operating upon the closure of each relay of the plurality for initiating an operation of the recording device, and counter means for indicating, upon de-energization of the time indicating device, the number of recordings included.

13. A measuring device comprising a pair of circuit closure elements adapted to be operated in sequence, a relay element responsive to each of the circuit closure elements so that closure of each of said elements energizes one relay, means associated with the first of the relays for maintaining the said relay in an energized state upon initial energization thereof, a time indicating device, means responsive to the operation of the first of the relay elements for initiating a continuing operation of the time measuring element, means responsive to the operation of the second relay of the plurality for interrupting the operation of the time indicating element, a connection between the first relay element and the second relay element for conditioning the second relay element for operation at a time subsequent to the operation of the first relay element, a light responsive recording element for recording the image of the time indicating device, and means responsive to the operation of each of the relay elements for producing a substantially instantaneous light flash to illuminate the time indicating device at the instant of operation of the relay.

14. A measuring device comprising a pair of circuit closure elements adapted to be operated in sequence, a relay element responsive to each of the circuit closure elements so that closure of each of said elements energizes one relay, means associated with the first of the relays for maintaining the relay in an energized state upon initial energization thereof, a clock element, power means to drive the clock, means responsive to the operation of the first of the relay elements for initiating a continuing operation of the clock by the said power means, means responsive to the operation of the second relay of the plurality for interrupting the clock operation, a connection between the first relay element and the second relay element for conditioning the second relay element for operation at a time subsequent to the operation of the first relay element, a light responsive recording element for recording the image of the clock, means responsive to the operation of each of the relay elements for producing an initial light flash to illuminate the clock at the instant of operation of the relay, and means responsive to the operation of the second relay of the plurality for producing an indication of the number of recordings produced.

15. A measuring device comprising a pair of circuit closure elements adapted to be operated in sequence, a relay element responsive to each of the circuit closure elements so that closure of each of said elements energizes one relay, means associated with the first of the relays for maintaining the said relay in an energized state upon initial energization thereof, a time indicating device, means responsive to the operation of the first of the relay elements for initiating a continuing operation of the time measuring element, means responsive to the operation of the second relay of the plurality for interrupting the operation of the time indicating element, a connection between the first relay element and the second relay element for conditioning the second relay element for operation at a time subsequent to the operation of the first relay element, a light responsive recording element for recording the image of the time indicating device, means responsive to the operation of each of the relay elements for producing a substantially instantaneous light flash to illuminate the time indicating device at the instant of operation of the relay, means responsive to the operation of the second relay of the plurality for producing an indication of the number of recordings produced, and means responsive to the instaneous light flash for producing audible indications of each recording time period.

16. A measuring device comprising a pair of circuit closure elements adapted to be operated in sequence, a relay element responsive to each of the circuit closure elements so that operation of each of said elements energizes the relay associated therewith, means associated with the first of the relays for maintaining the said relay in an energized state upon initial energization thereof, a time indicating and measuring device, means responsive to the operation of the first of the relay elements for initiating a continuing operation of the time measuring device, means responsive to the operation of the second relay of the plurality for interrupting the operation of the time indicating element, a connection between the first relay element and the second relay element for conditioning the second relay element for operation at a time subsequent to the operation of the first relay element, a camera having contained therein a light responsive film for recording the image of the time indicating device, means responsive to the operation of each of the relay elements for producing a substantially instantaneous light flash to illuminate the time indicating device at the instant of operation of the relay so as to produce an indication of the time measuring device on the film, and a camera actuating relay for moving a new film record area into the light path for recording the instantaneous positions of the time indicating device.

17. A measuring device comprising a pair of circuit closure elements adapted to be operated in sequence, a relay element responsive to each of the circuit closure elements so that operation of each of said elements energizes the relay means associated therewith, means to normally maintain the relay elements in an energized state upon initial energization thereof, a time measuring device, means responsive to the operation of the first of the relay elements for initiating a continuing operation of the time measuring device, means responsive to the operation of the second relay of the plurality for interrupting the operation of the time measuring device, a connection between the first relay element and the second relay element for conditioning the second relay element for operation at a time subsequent to the operation of the first relay element, a camera having contained therein a light responsive film for recording the image of the time measuring device, means responsive to the operation of each of the relay elements for producing an initial light flash to illuminate the time measuring device at the instant of operation of the relay, means responsive to the operation of the second relay of the plurality for producing an indication of the number of recordings produced by the camera, means responsive to the instantaneous light flash for producing audible indications of each recording time period, and a camera actuating relay for moving a new film record area into the light path for recording the instantaneous positions of the time indicating device.

18. A measuring and indicating device comprising a plurality of circuit closure elements adapted to be operated in a predetermined sequence, a relay element connected to each of the circuit closure elements to be responsive thereto so that closure of each of said elements energizes one relay of the plurality, means associated with each of the first of the relays of the plurality for maintaining the relay in an energized state upon initial energization thereof, a time measuring device, means responsive to the operation of the first of the relay elements of the plurality for initiating a continuing operation of the time measuring element, means responsive to the operation of the last relay of the plurality for interrupting the operation of the time measuring device, a connection between each relay element of the plurality and the next relay element of the plurality for conditioning the next relay element of the plurality for operation at a time subsequent to the operation of the first relay element, a camera having contained therein a light responsive film for recording the image of the time indicating device, means responsive to the operation of each of the relay elements for producing at substantially the instant of relay energization a substantially instantaneous light flash to illuminate the time measuring device, means responsive to the operation of the predetermined relays of the plurality for producing indications of the number of recordings produced, and a camera actuating relay for moving a new film record area into the light path for recording the instantaneous positions of the time measuring device.

CHESTER W. CALDWELL.
ARTHUR K. BRANHAM.